US010091034B2

(12) United States Patent
Oya et al.

(10) Patent No.: US 10,091,034 B2
(45) Date of Patent: Oct. 2, 2018

(54) RECEPTION DEVICE, RECEPTION METHOD, AND TRANSMISSION RECEPTION SYSTEM

(71) Applicant: Mitsubishi Electric Corporation, Tokyo (JP)

(72) Inventors: Aki Oya, Tokyo (JP); Masataka Imao, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/589,547

(22) Filed: May 8, 2017

(65) Prior Publication Data
US 2017/0359206 A1    Dec. 14, 2017

(30) Foreign Application Priority Data

Jun. 8, 2016 (JP) ................................. 2016-113981

(51) Int. Cl.
*H04L 25/08* (2006.01)
*H04L 1/00* (2006.01)
(Continued)

(52) U.S. Cl.
CPC ............ *H04L 25/08* (2013.01); *H04L 1/0054* (2013.01); *H04L 27/22* (2013.01); *H04L 69/22* (2013.01); *H04L 27/20* (2013.01)

(58) Field of Classification Search
CPC ... H04L 25/08; H04L 25/0858; H04L 1/0033; H04L 1/0036; H04L 1/0039;
(Continued)

(56) References Cited

U.S. PATENT DOCUMENTS 6,570,935 B1      5/2003   Sugita
6,678,337 B1 *    1/2004   Sugita ............... H04L 25/03019
                                                      375/324

(Continued)

FOREIGN PATENT DOCUMENTS

JP      11-341094 A      12/1999
JP     2002-247011 A      8/2002
(Continued)

*Primary Examiner* — Siu Lee
(74) *Attorney, Agent, or Firm* — Birch, Stewart, Kolasch & Birch, LLP

(57) ABSTRACT

Provided are a reception device, a reception method and a transmission reception system capable of reducing the influence of distortion in a received signal and achieving high demodulation performance without performing a computation process having a great amount of calculations. The reception device receives a signal containing a known signal part and a data part, and includes a conversion unit that converts the signal received by a reception unit into a digital signal, a region determination unit that determines a nonuse region which is a periodic region containing distortion in the digital signal, on a basis of a first digital signal in the known signal part contained in the digital signal and a known signal held in advance, and a demodulation unit that performs demodulation on the digital signal by using a second digital signal in a region other than the nonuse region in the digital signal.

8 Claims, 7 Drawing Sheets

(51) Int. Cl.
*H04L 29/06* (2006.01)
*H04L 27/22* (2006.01)
*H04L 27/20* (2006.01)

(58) Field of Classification Search
CPC ... H04L 1/0041; H04L 1/0045; H04L 1/0047; H04L 1/0054; H04L 69/22
USPC ........ 375/259, 260, 295, 316, 340, 342, 346
See application file for complete search history.

(56) References Cited

U.S. PATENT DOCUMENTS

| | | | |
|---|---|---|---|
| 6,967,694 B1* | 11/2005 | Ninomiya | H04H 40/27 348/726 |
| 2009/0103645 A1 | 4/2009 | Jitsukawa et al. | |
| 2010/0232797 A1* | 9/2010 | Cai | H04J 14/02 398/79 |
| 2011/0293051 A1 | 12/2011 | Lozhkin | |
| 2014/0086229 A1 | 3/2014 | Yosoku et al. | |

FOREIGN PATENT DOCUMENTS

| | | |
|---|---|---|
| JP | 2011-250007 A | 12/2011 |
| WO | WO 2008/001457 A1 | 1/2008 |
| WO | WO 2013/136694 A1 | 9/2013 |

\* cited by examiner

RECEPTION DEVICE, RECEPTION METHOD, AND TRANSMISSION RECEPTION SYSTEM

BACKGROUND OF THE INVENTION

1. Field of the Invention

The present invention relates to a reception device and a reception method for receiving signals and a transmission reception system including a transmission device and a reception device.

2. Description of the Related Art

In visible light communication as wireless communication, signal light is emitted from an LED (Light-Emitting Diode) of a transmission unit of a transmission device and the signal light is received by a light receiving sensor (PD: photodiode) of a reception unit of a reception device. The transmission device includes an analog circuit for driving the LED, while the reception device includes an analog circuit for amplifying an output from the PD. When a signal is transmitted by using a PSK (Phase Shift Keying) modulation method, the signal waveform after the modulation has high-frequency components at symbol boundaries in many cases. The signal after the modulation passes through the analog circuit for driving the LED and also passes through the analog circuit for amplifying the output from the PD. In a case where the signal waveform input to an analog circuit has high-frequency components, distortion can occur in the signal waveform and the influence of the distortion increases with an increase in the high-frequency components.

In a case of low-speed communication for transmitting a small amount of data such as position information, the distortion due to the high-frequency components at the symbol boundaries is low enough to have no influence on the demodulation performance since the symbol length in PSK is long. However, in a case of high-speed communication for transmitting a large amount of data such as images and videos, the symbol length is short, and thus there is the possibility of an increase in the distortion due to the high-frequency components at the symbol boundaries and deterioration in reception quality such as the demodulation performance.

Patent Document 1 discloses a reception device including a computation unit that makes compensation for distortion occurring in an analog circuit.

Patent Document 1 is Japanese Patent Application Publication No. 2011-250007.

However, the reception device described in Patent Document 1 performs nonlinear computation having a great amount of calculations as the computation for making the compensation for the distortion occurring in the transmission device, and thus has a problem in that a computation unit having high processing power is necessary.

SUMMARY OF THE INVENTION

The present invention has been made to resolve the above-described problem, and the object of the present invention is to provide a reception device, a reception method and a transmission reception system capable of reducing the influence of the distortion in a received signal and achieving high demodulation performance without performing computation processing having a great amount of calculations.

A reception device according to an aspect of the present invention receives a signal containing a known signal part and a data part, and includes a conversion unit that converts the signal received by a reception unit into a digital signal; a region determination unit that determines a nonuse region which is a periodic region containing distortion in the digital signal, on a basis of a first digital signal in the known signal part contained in the digital signal and a known signal held in advance; and a demodulation unit that performs demodulation on the digital signal by using a second digital signal in a region other than the nonuse region in the digital signal.

A transmission reception system according to another aspect of the present invention includes a transmission device that transmits a signal containing a known signal part and a data part; and a reception device that includes a conversion unit that converts the signal received by a reception unit into a digital signal; a region determination unit that determines a nonuse region which is a periodic region containing distortion in the digital signal, on a basis of a first digital signal in the known signal part contained in the digital signal and a known signal held in advance; and a demodulation unit that performs demodulation on the digital signal by using a second digital signal in a region other than the nonuse region in the digital signal.

A reception method according to another aspect of the present invention receives a signal containing a known signal part and a data part, and includes a conversion step of converting the received signal into a digital signal; a region determination step of determining a nonuse region which is a periodic region containing distortion in the digital signal, on a basis of a first digital signal in the known signal part contained in the digital signal and a known signal held in advance; and a demodulation step of performing demodulation on the digital signal by using a second digital signal in a region other than the nonuse region in the digital signal.

According to the present invention, the influence of the distortion is reduced by performing demodulation by using the received signal in regions other than regions containing a lot of distortion, and thus the influence of the distortion in the received signal can be reduced and high demodulation performance can be achieved without performing computation processing having a great amount of calculations.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

<1> First Embodiment

Figure 1:
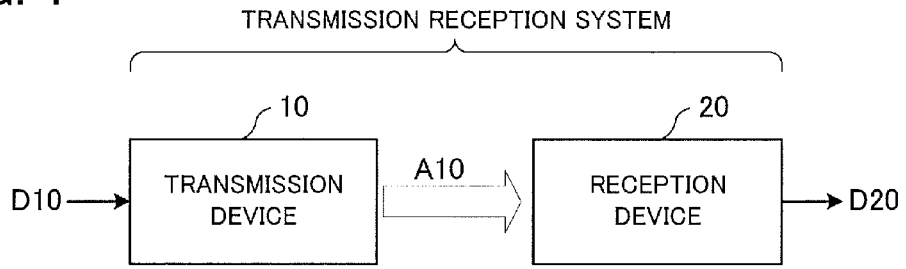
FIG. 1 is a block diagram showing a general configuration of a transmission reception system according to a first embodiment of the present invention.

FIG. 1 is a block diagram showing a general configuration of a transmission reception system according to a first embodiment of the present invention. As shown in FIG. 1, the transmission reception system according to the first embodiment includes a transmission device 10 and a reception device 20. The transmission device 10 receives transmission data D10, performs modulation on the received transmission data D10, and transmits a transmission signal obtained by the modulation, that is, transmits a signal A10 based on the input transmission data D10. The transmission data D10 can be supplied to the transmission device 10 from any type of device. The reception device 20 receives (detects) the signal A10 transmitted from the transmission device 10, performs processing such as demodulation on the received signal, and thereby obtains reception data D20. The communication between the transmission device 10 and the reception device 20 is carried out by using radio waves or light and the communication can be either wireless communication or wire communication.

Figure 2:
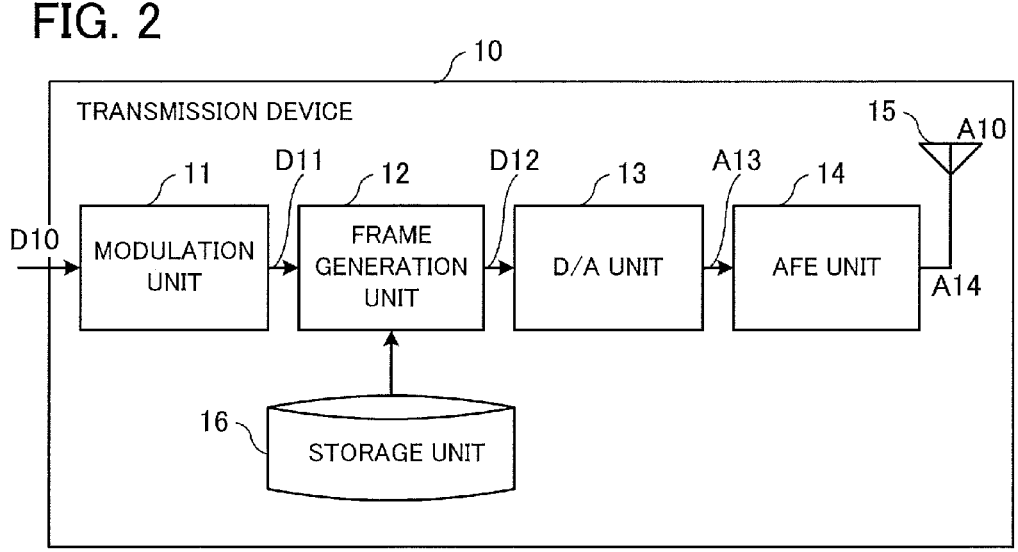
FIG. 2 is a block diagram showing a general configuration of a transmission device in the transmission reception system of FIG. 1.

FIG. 2 is a block diagram showing a general configuration of the transmission device 10 in the transmission reception system of FIG. 1. As shown in FIG. 2, the transmission device 10 includes a modulation unit (modulator) 11, a frame generation unit 12, a D/A (Digital to Analog) unit 13 as a conversion unit (converter), an AFE (Analog Front End) unit 14 as an adjustment unit for adjusting signal intensity, an antenna unit (transmission unit) 15 for transmitting the signal A10, and a storage unit 16 for storing a preamble waveform and a known signal waveform. The modulation unit 11 and the frame generation unit 12 carry out digital signal processing. The D/A unit 13 converts a digital signal into an analog signal. The AFE unit 14 and the antenna unit 15 carry out analog signal processing.

The transmission data D10 is input to the modulation unit 11. The modulation unit 11 performs the modulation on the input transmission data D10 and supplies data D11 obtained as a modulation result 300 to the frame generation unit 12.

Figure 3:
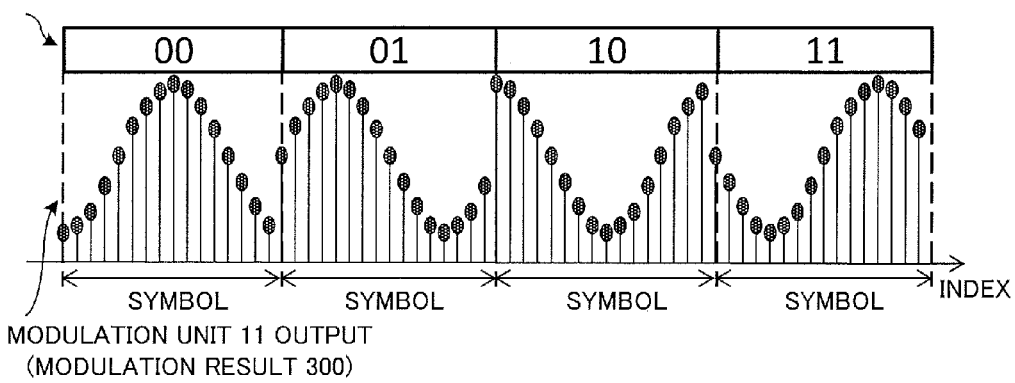
FIG. 3 is a diagram showing an example of a modulation result calculated by a modulation unit in the transmission device of FIG. 2.

FIG. 3 is a diagram showing an example of the modulation result 300 calculated by the modulation unit 11 in the transmission device 10 of FIG. 2. FIG. 3 shows an example of 2-bit data input to the modulation unit 11 (upper part of FIG. 3) and modulation result data output from the modulation unit 11 (lower part of FIG. 3) in a case where the modulation unit 11 employs a 4PSK modulation method. Specifically, FIG. 3 shows pieces of 1-symbol data output from the modulation unit 11 (MODULATION UNIT 11 OUTPUT in FIG. 3) corresponding to 2-bit data "00", "01", "10" and "11" input to the modulation unit 11 (MODULATION UNIT 11 INPUT in FIG. 3). In the MODULATION UNIT 11 OUTPUT shown in FIG. 3, the vertical axis represents signal intensity of each sample and the horizontal axis represents a time axis. As shown in FIG. 3, the modulation unit 11 detects the input transmission data D10 as 2-bit data "00", "01", "10" or "11" and successively outputs the pieces of the modulation result data D11 corresponding to the detected 2-bit data. Incidentally, the modulation unit 11 can also employ a different modulation method such as PSK (Phase Shift Keying), ASK (Amplitude Shift Keying) or PPM (Pulse Shift Modulation).

The storage unit 16 holds the preamble waveform determined previously and the known signal waveform determined previously. The preamble waveform and the known signal waveform are supplied from the storage unit 16 to the frame generation unit 12. Incidentally, the known signal waveform includes a combination of the waveforms of respective symbols (the modulation unit 11 output in FIG. 3) shown in the data obtained as the modulation result 300.

The frame generation unit 12 generates a transmission signal D12 on the basis of the data D11 obtained as the modulation result 300 received from the modulation unit 11, and the preamble waveform and the known signal waveform received from the storage unit 16, and supplies the transmission signal D12 to the D/A unit 13.

Figure 4:
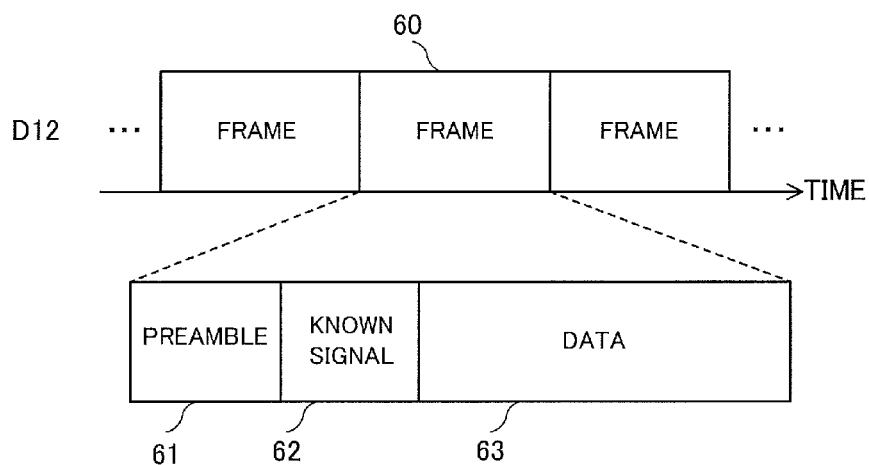
FIG. 4 is a diagram showing an example of a configuration of a transmission signal generated by a frame generation unit in the transmission device of FIG. 2.

FIG. 4 is a diagram showing an example of a configuration of the transmission signal D12 generated by the frame generation unit 12 in the transmission device 10 of FIG. 2. The transmission signal D12 is formed of a plurality of consecutive frames 60. Each of the frames 60 includes a preamble part 61, a known signal part 62 and a data part 63.

The frame generation unit 12 stores the preamble waveform read out from the storage unit 16 in the preamble part 61, stores the known signal waveform read out from the storage unit 16 in the known signal part 62, and stores the modulation result 300 received from the modulation unit 11 in the data part 63. The frame generation unit 12 supplies the generated transmission signal D12 to the D/A unit 13. The known signal part 62 and the data part 63 respectively store waveforms corresponding to a plurality of symbols.

The D/A unit 13 converts the digital transmission signal D12 received from the frame generation unit 12 into an analog transmission signal A13 and supplies the transmission signal A13 to the AFE unit 14.

The AFE unit 14 supplies a transmission signal A14, obtained by linearly transforming the analog transmission signal A13 received from the D/A unit 13 into voltage and current values suitable for the input to the antenna unit 15, to the antenna unit 15. Since the AFE unit 14 is formed of an analog circuit, the AFE unit 14 has circuit characteristics such as attenuation of high-frequency components. Therefore, when a signal waveform input to the analog circuit of the AFE unit 14 has high-frequency components, distortion occurs in the signal waveform.

The antenna unit 15 transmits the transmission signal A14 received from the AFE unit 14 to the outside of the transmission device 10 as a radio wave (the signal A10). In cases where the transmission reception system according to the first embodiment is a visible light communication system as an optical communication system, the antenna unit 15 is a transmission unit equipped with an LED for outputting signal light (the signal A10). In this case, the AFE unit 14 linearly transforms the voltage and current values so that light emission luminance of the LED constituting the antenna unit 15 (intensity of the signal light) takes on values proportional to the analog signal output from the D/A unit 13.

Figure 5:
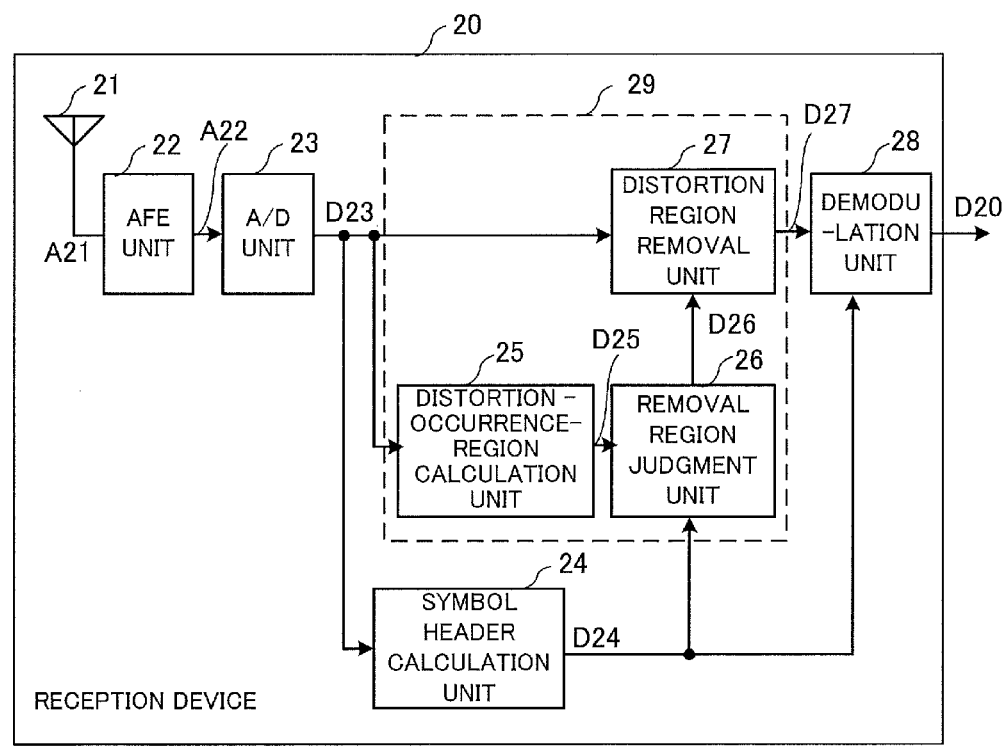
FIG. 5 is a block diagram showing a general configuration of a reception device in the transmission reception system of FIG. 1.

FIG. 5 is a block diagram showing a general configuration of the reception device 20 in the transmission reception system of FIG. 1. The reception device 20 is a device capable of executing a reception method according to the first embodiment. As shown in FIG. 5, the reception device 20 includes an antenna unit (reception unit) 21 for receiving the transmission signal A10, an AFE unit 22 as an adjustment unit for adjusting signal intensity, an A/D (Digital to Analog) unit 23 as a conversion unit (converter), a symbol header calculation unit (symbol header detection unit) 24, a distortion-occurrence-region calculation unit 25, a removal region judgment unit 26, a distortion region removal unit 27, and a demodulation unit (demodulator) 28. The distortion-occurrence-region calculation unit 25, the removal region judgment unit (region judgment unit) 26 and the distortion region removal unit (region removal unit) 27 form a region determination unit 29. The region determination unit 29 performs a process of calculating distortion occurrence regions containing distortion the amount of which is higher than or equal to a predetermined reference value in a signal D23, determines nonuse regions not used for the demodulation by the demodulation unit 28 on the basis of a result of the process, and has the demodulation unit 28 perform the demodulation by using digital signals in regions other than the nonuse regions. The antenna unit 21 and the AFE unit 22 carry out analog signal processing. The A/D unit 23 converts an analog signal into a digital signal. The symbol header calculation unit 24, the distortion-occurrence-region calculation unit 25, the removal region judgment unit 26, the distortion region removal unit 27 and the demodulation unit 28 carry out digital signal processing.

The antenna unit 21 receives (detects) the transmission signal A10 transmitted from the transmission device 10 and supplies a signal A21 corresponding to the transmission signal A10 to the AFE unit 22. In cases where the transmission reception system according to the first embodiment is a visible light communication system, the antenna unit 21 is a reception unit equipped with an optical sensor, such as a PD, for detecting the intensity of the signal light.

The AFE unit 22 supplies a signal A22, obtained by linearly transforming the signal A21 received from the antenna unit 21 into voltage and current values suitable for the input to the A/D unit 23, to the A/D unit 23. For example, in cases where the antenna unit 21 is formed with an optical sensor for detecting the intensity of the signal light, output voltage of the optical sensor is weak as compared to a specified value of maximum input voltage of the A/D unit 23. Thus, the AFE unit 22 generates the signal A22 by adjusting (amplifying) the signal amplitude of the signal A21 received from the antenna unit 21 by using an amplifier.

However, since the AFE unit 22 is formed of an analog circuit, the AFE unit 22 has circuit characteristics such as attenuation of high-frequency components. Therefore, similarly to the AFE unit 14 of the transmission device 10, when a signal waveform input to the analog circuit of the AFE unit 22 of the reception device 20 has high-frequency components, the analog circuit can cause distortion in the signal waveform.

The A/D unit 23 converts the analog signal A22 received from the AFE unit 22 into the digital signal D23 and supplies the digital signal D23 to the symbol header calculation unit 24, the distortion-occurrence-region calculation unit 25 and the distortion region removal unit 27.

Figure 6:
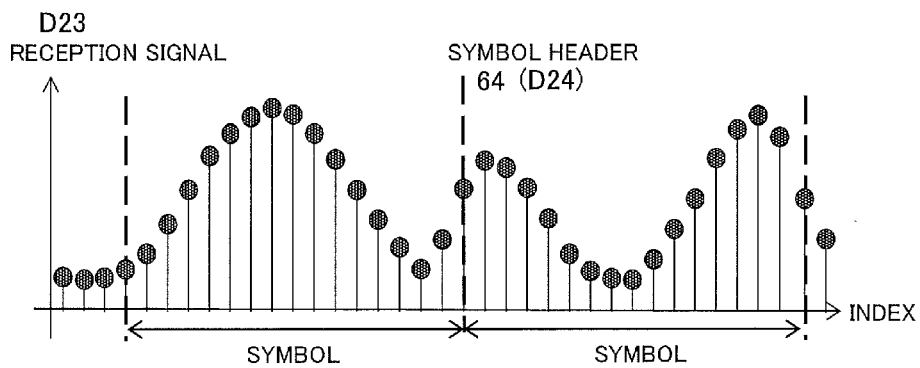
FIG. 6 is a diagram showing an example of an output waveform of an A/D unit in the reception device of FIG. 5.

FIG. 6 is a diagram showing an example of an output waveform of the A/D unit 23 (the signal D23) in the reception device 20 of FIG. 5. In the output of the A/D unit 23 shown in FIG. 6, the vertical axis represents signal intensity of each sample indicated by a vertical line and a circle at the tip of the vertical line, and the horizontal axis represents a time axis. FIG. 6 shows an example of the reception signal D23 output from the A/D unit 23 in the case where the modulation unit 11 has performed the modulation by the 4PSK method. Nonlinear distortion due to the processing by the analog circuits (e.g., the AFE unit 14 of the transmission device 10 and the AFE unit 22 of the reception device 20) is likely to appear in the vicinity of symbol boundaries (in the vicinity of symbol headers) where the high-frequency components increase.

The symbol header calculation unit 24 receives the signal D23 output from the A/D unit 23, detects the positions of frames contained in the signal D23 on the basis of the preamble parts 61, thereafter calculates (detects) the symbol headers 64 (D24) as start positions of symbols contained in the known signal part 62 and the data part 63, and supplies the calculated symbol headers 64 (D24) (i.e., information on the symbol headers 64 (D24), the same goes for the following description) to the removal region judgment unit 26 and the demodulation unit 28.

The distortion-occurrence-region calculation unit 25 calculates the distortion occurrence regions 210 (D25), as regions in the reception signal D23 that have significantly undergone the influence of the distortion, on the basis of the signal D23 received from the A/D unit 23, and sends the calculated distortion occurrence regions 210 (D25) (i.e., information on the distortion occurrence regions 210 (D25), the same goes for the following description) to the removal region judgment unit 26.

Figure 7:
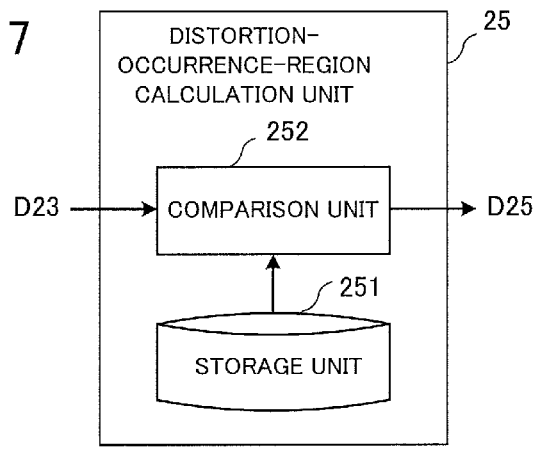
FIG. 7 is a block diagram showing a general configuration of a distortion-occurrence-region calculation unit in the reception device of FIG. 5.

FIG. 7 is a block diagram showing a general configuration of the distortion-occurrence-region calculation unit 25 in the reception device 20 of FIG. 5. As shown in FIG. 7, the distortion-occurrence-region calculation unit 25 includes a comparison unit 252 and a storage unit 251 for storing the known signal waveform.

The storage unit 251 holds the same known signal waveform as that held in the storage unit 16 in the transmission device 10 of FIG. 2 and supplies the known signal waveform to the comparison unit 252.

The comparison unit 252 compares a known signal waveform represented by the known signal part (62 in FIG. 4) of the signal D23 received from the A/D unit 23 (waveform containing distortion components caused by the analog circuits) with the known signal waveform received from the storage unit 251 (reference waveform containing no distortion components), thereby calculates the regions (distortion occurrence regions) 210 in the known signal part where distortion has occurred, and supplies the information D25 representing the distortion occurrence regions 210 to the removal region judgment unit 26.

Figure 8:
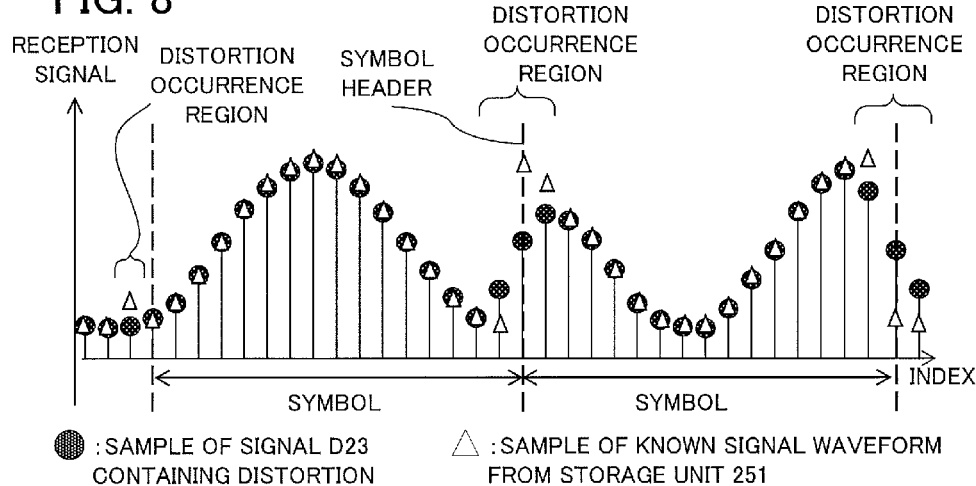
FIG. 8 is a diagram showing an example of distortion occurrence regions calculated by the distortion-occurrence-region calculation unit in the reception device of FIG. 5.

FIG. 8 is a diagram showing an example of the distortion occurrence regions 210 output from the comparison unit 252. The comparison unit 252 compares the known signal waveform contained in the signal D23 output from the A/D unit 23 with the known signal waveform received from the storage unit 251, and on the basis of a result of the comparison, provides the information for judging whether each sample region is a distortion occurrence region 210 or not. For example, the comparison unit 252 compares the known signal waveform contained in the signal D23 output from the A/D unit 23 with the known signal waveform received from the storage unit 251 and judges the sample region as the distortion occurrence region 210 when their difference is greater than or equal to a constant value (threshold value as a criterion) (that is, when the region contains distortion, the amount of which is higher than or equal to a predetermined reference value).

The removal region judgment unit 26 calculates regions in the symbol where the possibility of occurrence of distortion is high on the basis of the information D25 representing the distortion occurrence regions 210 received from the distortion-occurrence-region calculation unit 25 and the symbol headers 64 (D24) received from the symbol header calculation unit 24, and sends the calculated regions in the symbol as removal regions (i.e., information on the removal regions, the same goes for the following description) to the distortion region removal unit 27.

Figure 9:
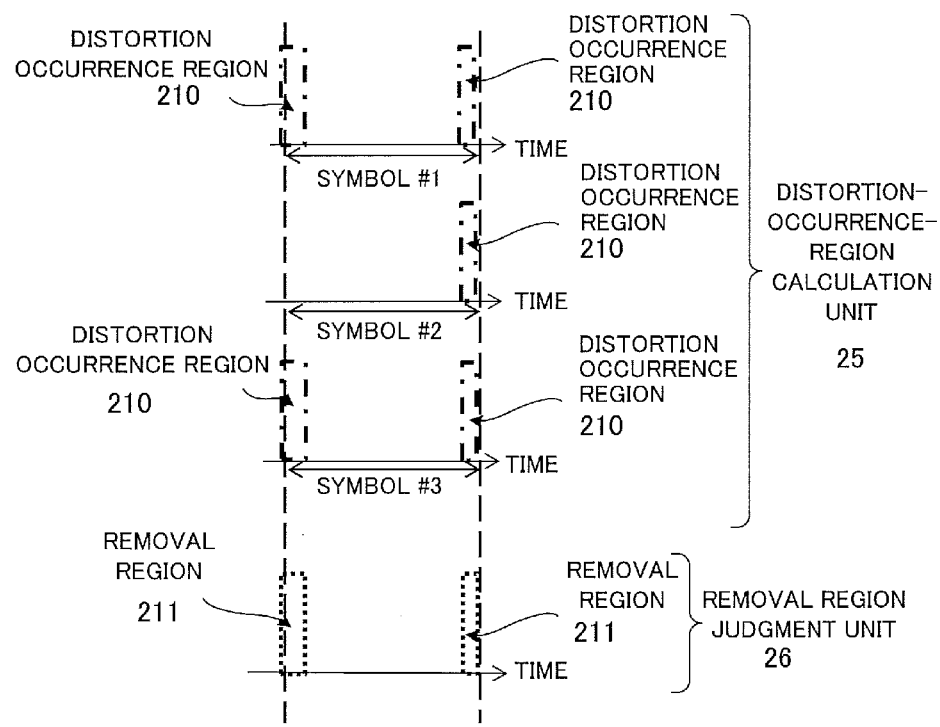
FIG. 9 is a diagram showing an example of removal regions calculated by a removal region judgment unit in the reception device of FIG. 5.

FIG. 9 is a diagram showing an example of the removal regions 211 (D26) calculated by the removal region judgment unit 26 in the reception device 20 of FIG. 5. The more the waveform includes high frequency components, the more distortion occurs in the AFE unit 14 and the AFE unit 22. Therefore, the distortion occurrence regions 210 arising in the symbol vary depending on the transmitted signal waveform.

As an example, the removal region judgment unit 26 may output the information in which a region which becomes the distortion occurrence region 210 with a ratio per symbol higher than or equal to a constant value in the plurality of symbols constituting the known signal part (62 in FIG. 4) is regarded as the removal region 211.

As another example, the removal region judgment unit 26 may output the information in which the distortion occurrence region 210 which is the largest distortion occurrence region per symbol in the plurality of symbols constituting the known signal part (62 in FIG. 4) is regarded as the removal region 211.

The distortion region removal unit 27 performs a distortion removal process on the reception signal D23 containing distortion on the basis of the signal D23 received from the A/D unit 23 and the removal regions 211 (D26) received from the removal region judgment unit 26, and supplies a signal D27 obtained as a result of the distortion removal process to the demodulation unit 28.

Figure 10:
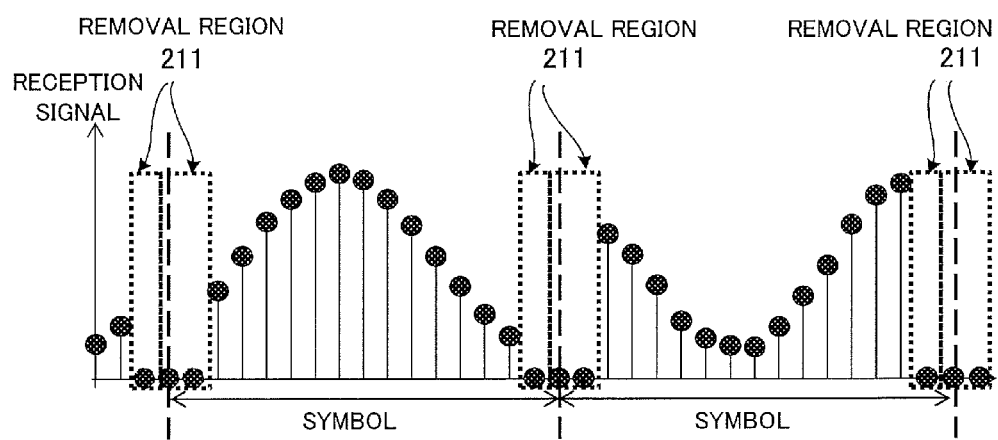
FIG. 10 is a diagram showing an example of a reception signal after distortion removal by a distortion region removal unit in the reception device of FIG. 5.

FIG. 10 is a diagram showing an example of the signal D27 after the distortion removal by the distortion region removal unit 27 in the reception device 20 of FIG. 5. As shown in FIG. 10, the distortion region removal unit 27 changes sample values of the reception signal D23 existing in the removal regions 211 in each symbol to 0.

As another example, it is also possible to delete the sample values of the reception signal D23 existing in the removal regions 211 in each symbol instead of changing the sample values to 0.

The demodulation unit 28 performs the demodulation on the basis of the signal D27 received from the distortion region removal unit 27 and the symbol headers D24 (64 in FIG. 6) received from the symbol header calculation unit 24, and outputs the data D20 as a demodulation result.

For example, in the case where the modulation unit 11 of the transmission device 10 employs the 4PSK modulation method, the demodulation unit 28 of the reception device 20 calculates correlation between sample values of symbols of the reception signal D23 and a modulation result 300 corresponding to each piece of data, and outputs data corresponding to a modulation result 300 giving the maximum correlation value as the demodulation result.

Although the use of the distortion compensation technology described in Patent Document 1 reduces the influence of the distortion received in an analog circuit and improves the reception quality, a computation unit having high processing power is necessary for making the compensation for the distortion occurring in the transmission device 10.

In contrast, the reception device 20, the reception method and the transmission reception system according to the first embodiment are advantageous in that the influence of the distortion can be reduced by removing signals that underwent distortion from the reception signal, with a smaller amount of calculations compared to making the compensation for the distortion.

Further, according to the reception device 20, the reception method and the transmission reception system of the first embodiment, the distortion occurrence regions 210 are calculated dynamically, and thus the distortion occurrence regions can be detected appropriately even when the transmission device 10 is switched to another transmission device and there is a change in the distortion occurrence regions where distortion occurs due to processing by analog circuits.

<2> Second Embodiment

Figure 11:
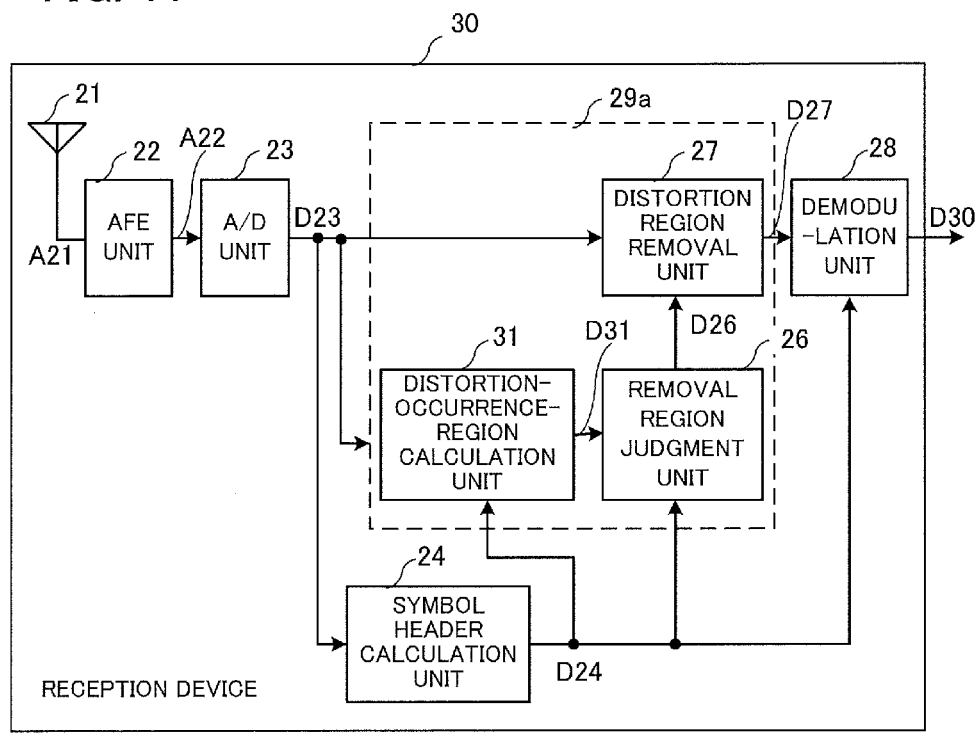
FIG. 11 is a block diagram showing a general configuration of a reception device in a transmission reception system according to a second embodiment of the present invention.

FIG. 11 is a block diagram showing a general configuration of a reception device 30 of a transmission reception system according to a second embodiment of the present invention. The reception device 30 is a device capable of executing a reception method according to the second embodiment and obtains reception data D30 as a demodulation result. In FIG. 11, components identical or corresponding to those in FIG. 5 (first embodiment) are assigned the same reference characters as in FIG. 5. The reception device 30 in the second embodiment differs from the reception device 20 in the first embodiment in that the symbol headers 64 (D24) output from the symbol header calculation unit 24 are supplied not only to the removal region judgment unit 26 and the demodulation unit 28 but also to a distortion-occurrence-region calculation unit 31 and in contents of the processing by the distortion-occurrence-region calculation unit 31. The distortion-occurrence-region calculation unit 31, the removal region judgment unit 26 and the distortion region removal unit 27 form a region determination unit 29a. Except for the above differences, the reception device 30 in the second embodiment is equivalent to the reception device 20 in the first embodiment.

The distortion-occurrence-region calculation unit 31 calculates distortion occurrence regions 210 (D31), as regions in the reception signal D23 that have significantly undergone the influence of the distortion, on the basis of the reception signal D23 received from the A/D unit 23 and the symbol headers 64 received from the symbol header calculation unit 24, and sends the calculated distortion occurrence regions 210 (D31) (i.e., information on the distortion occurrence regions 210 (D31), the same goes for the following description) to the removal region judgment unit 26.

Figure 12:
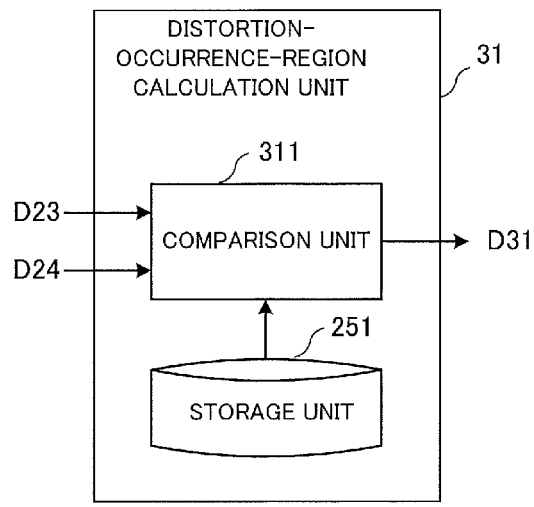
FIG. 12 is a block diagram showing a general configuration of a distortion-occurrence-region calculation unit in the reception device of FIG. 11.

FIG. 12 is a block diagram showing a general configuration of the distortion-occurrence-region calculation unit 31 in the reception device 30 of FIG. 11. In FIG. 12, components identical or corresponding to those in FIG. 7 (first embodiment) are assigned the same reference characters as in FIG. 7. As shown in FIG. 12, the distortion-occurrence-region calculation unit 31 includes a comparison unit 311 and a storage unit 251. The configuration and operation of the storage unit 251 are equivalent to those of the storage unit 251 in the first embodiment.

The comparison unit 311 calculates the reception signal's regions where distortion occurred on the basis of the signal D23 received from the A/D unit 23, the known signal waveform received from the storage unit 251 and the symbol headers 64 (D24) received from the symbol header calculation unit 24, with a smaller amount of calculations compared to the comparison unit 252 in the first embodiment, and sends the information on the calculated regions to the removal region judgment unit 26.

In the case where the modulation unit 11 employs the 4PSK modulation method, the high-frequency components of the transmission signal occur at the symbol headers 64. Therefore, the distortion occurs a lot in the vicinity of the symbol headers 64 where the high-frequency components occur.

The comparison unit 311, assuming that the distortion occurs only in several samples in the vicinity of the symbol header 64, calculates the signal regions where the distortion occurred by making a comparison between the reception signal D23 and sample values of the corresponding known signal waveform received from the storage unit 251 only for several samples in the vicinity of the symbol header 64 (e.g., a predetermined number of samples in front of the symbol header and a predetermined number of samples after the symbol header), and sends the information on the calculated regions to the removal region judgment unit 26.

As another example, in cases where the modulation unit 11 employs a PPM modulation method, the high-frequency components of the transmission signal concentrate at slot start positions. Therefore, the comparison unit 311, assuming that the distortion occurs only in several samples (a predetermined number of samples) in the vicinity of the slot start position, calculates the reception signal's regions where the distortion occurred by making a comparison between the signal D23 and sample values of the corresponding known signal waveform received from the storage unit 251 only for several samples in the vicinity of the slot start position, and sends the information on the calculated regions to the removal region judgment unit 26.

The reception device 30, the reception method and the transmission reception system according to the second embodiment are advantageous in that the influence of the distortion can be reduced by removing signals that underwent distortion from the reception signal, with a smaller amount of calculations compared to making the compensation for the distortion. Further, by making the distortion occurrence judgment only in regions where distortion is likely to occur, the amount of calculations for the distortion occurrence region calculation can be reduced further.

Furthermore, according to the reception device 30, the reception method and the transmission reception system of the second embodiment, the distortion occurrence regions 210 are calculated dynamically, and thus the distortion occurrence regions can be detected appropriately even when the transmission device 10 is switched to another transmission device and there is a change in the distortion occurrence regions where distortion occurs due to processing by analog circuits.

<3> Third Embodiment

Figure 13:
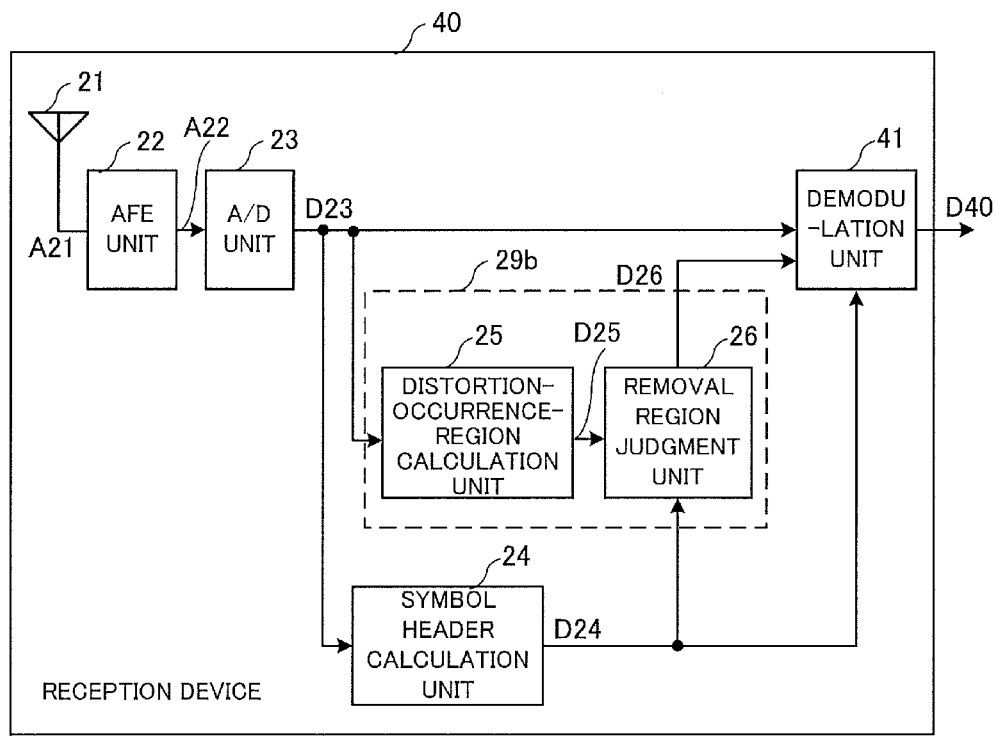
FIG. 13 is a block diagram showing a general configuration of a reception device in a transmission reception system according to a third embodiment of the present invention.

FIG. 13 is a block diagram showing a general configuration of a reception device 40 of a transmission reception system according to a third embodiment of the present invention. The reception device 40 is a device capable of executing a reception method according to the third embodiment. In FIG. 13, components identical or corresponding to those in FIG. 5 (first embodiment) are assigned the same reference characters as in FIG. 5. The reception device 40 of the transmission reception system according to the third embodiment differs from the reception device 20 of the transmission reception system according to the first embodiment in that the distortion region removal unit (27 in FIG. 5 and FIG. 11) is not provided, the A/D unit 23 outputs the reception signal D23 to a demodulation unit 41, and the removal region judgment unit 26 outputs the removal regions 211 to the demodulation unit 41, and in the function of the demodulation unit 41. Except for the above differences, the reception device 40 in the third embodiment is equivalent to the reception device 20 in the first embodiment. Incidentally, it is also possible to apply the configuration of the third embodiment to the reception device 30 in the second embodiment.

The demodulation unit 41 performs processing based on maximum likelihood demodulation on the basis of the signal D23 received from the A/D unit 23, the symbol headers 64 (D24) received from the symbol header calculation unit 24 and the removal regions 211 received from the removal region judgment unit 26, and outputs data as a demodulation result D40.

Likelihood is defined as a conditional probability of occurrence of the reception signal D23 of the modulation result 300. The demodulation unit 41 performing the maximum likelihood demodulation calculates conditional likelihood of a modulation result 300 corresponding to each piece of data and outputs data corresponding to a modulation result 300 giving the maximum likelihood as the demodulation result D40. Specifically, the demodulation unit 41 calculates the likelihood by using a modulation result obtained by removing the sample values of the reception signal D23 existing in the removal regions 211 (D26).

Figure 14:
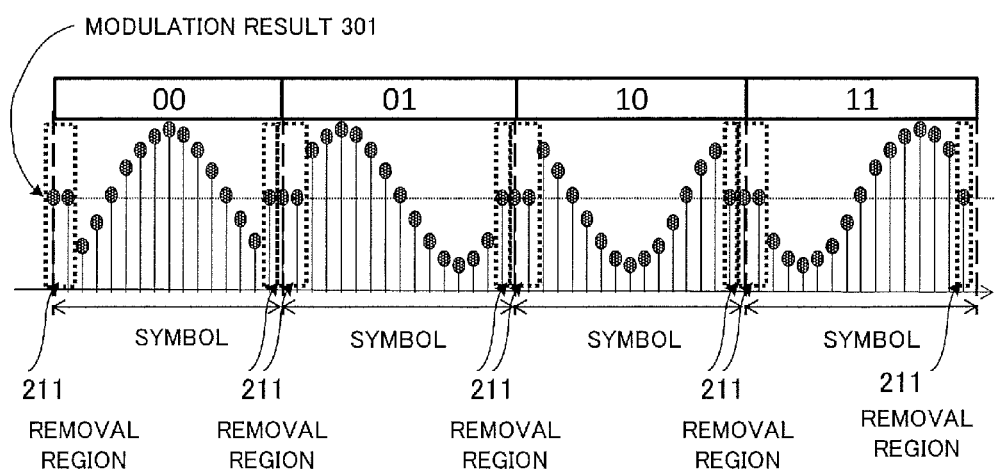
FIG. 14 is a diagram showing an example of a modulation result used by a demodulation unit in the reception device of FIG. 13.

FIG. 14 is a diagram showing an example of the modulation result used by the demodulation unit 41 in the reception device 40 of FIG. 13. FIG. 14 illustrates an example of the modulation result 301 obtained by removing the sample values of the reception signal D23 existing in the removal regions 211. For example, the sample values of the reception signal D23 existing in the removal regions 211 are set at the average value of the modulation result 300. This is because sample values of the reception signal D23 that underwent the influence of the distortion tend to be values close to the average value.

According to the reception device 40, the reception method and the transmission reception system of the third embodiment, information on the regions that underwent the distortion is removed from a likelihood condition. Accordingly, also in the reception device performing the maximum likelihood demodulation, the influence of the distortion can be reduced with a smaller amount of calculations compared to a conventional reception device performing distortion compensation.

Further, according to the reception device 40, the reception method and the transmission reception system of the third embodiment, the distortion occurrence regions 210 are calculated dynamically, and thus the distortion occurrence regions can be detected appropriately even when the transmission device 10 is switched to another transmission device and there is a change in the distortion occurrence regions where distortion occurs due to processing by analog circuits.

<4> Modifications

Figure 15:
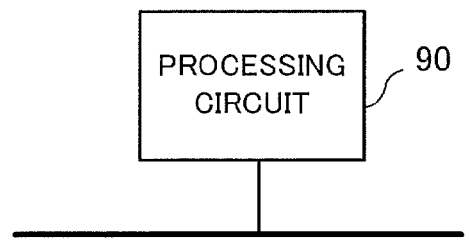
FIG. 15 is a hardware configuration diagram showing a general configuration of a modification example of the reception devices according to the first through third embodiments.

FIG. 15 is a hardware configuration diagram showing a general configuration of a modification example of the reception devices 20, 30 and 40 according to the above first through third embodiments. The components 21-29, 29a, 29b, 31 and 41 of the reception devices 20, 30 and 40 according to the first through third embodiments can be implemented by a semiconductor integrated circuit as a purpose-built processing circuit 90.

Figure 16:
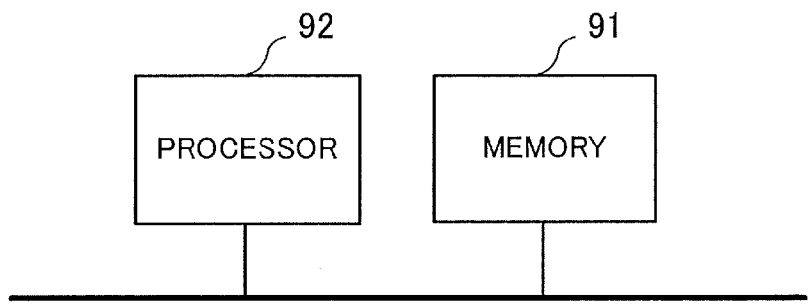
FIG. 16 is a hardware configuration diagram showing a general configuration of another modification example of the reception devices according to the first through third embodiments.

FIG. 16 is a hardware configuration diagram showing a general configuration of another modification example of the reception devices 20, 30 and 40 according to the above first through third embodiments. The components of the reception devices 20, 30 and 40 according to the first through third embodiments may also be implemented by using a memory 91 as a storage device for storing a program as software and a processor 92 as an information processing unit for executing the program stored in the memory 91 (e.g., by using a computer). It is also possible to implement part of the reception devices 20, 30 and 40 according to the first through third embodiments (e.g., the components 24-29 in FIG. 5, the components 24, 26-28, 31 and 29a in FIG. 11, or the components 24-26, 41 and 29b in FIG. 13) by use of the memory 91 and the processor 92 for executing the program shown in FIG. 16.

The present invention is applicable to a system having a position detection function by means of visible light communication. For example, the present invention is applicable to a system or the like in which light emitted from an LED illumination device (transmission device) installed on the ceiling of a room contains position information representing the installation position of the LED illumination device and the position information is acquired by a reception device when a person carrying the reception device passes under the LED illumination device.

The present invention is applicable also to a system in which an LED illumination device (transmission device) transmits advertisement information having contents corresponding to the installation position and a mobile terminal as a reception device receives the advertisement information (digital signage system). The reception device is capable of providing advertisements more suitable for the situation of the user by displaying advertisements on the reception device after receiving the advertisement information.

DESCRIPTION OF REFERENCE CHARACTERS IS AS FOLLOWS

10: transmission device, 20, 30, 40: reception device, 11: modulation unit, 12: frame generation unit, 13: D/A unit, 14: AFE unit, 15: antenna unit (transmission unit), 16: storage unit, 21: antenna unit (reception unit), 22: AFE unit, 23: A/D unit (conversion unit), 24: symbol header calculation unit (symbol header detection unit), 25, 31: distortion-occurrence-region calculation unit (region detection unit), 26: removal region judgment unit (region judgment unit), 27: distortion region removal unit (region removal unit), 28, 41: demodulation unit, 29, 29a, 29b: region determination unit, 60 (D12): frame, 61: preamble part, 62: known signal part, 63: data part, 64 (D24): symbol header, 210 (D25, D31): distortion occurrence region, 211 (D26): removal region, 251: storage unit, and 252, 311: comparison unit.

What is claimed is:

1. A reception device for receiving a signal containing a known signal part and a data part representing plural data modulation symbols, the reception device comprising:
   an A/D converter that converts the signal received by a receiver into a digital signal including said plural data modulation symbols;
   a region determinator that determines a nonuse region corresponding to a distortion region around transitions between adjacent data modulation symbols and produces a periodic signal identifying the distortion region; and
   a demodulator that performs demodulation on the digital signal in a region other than the nonuse region in the digital signal so as to demodulate each of the data modulation symbols.

2. The reception device according to claim 1, wherein the region determinator includes:
   a region detector that detects a distortion occurrence region containing distortion, an amount of which is not less than a predetermined reference value, in a first digital signal;
   a region judgment circuit that determines the nonuse region which is the periodic region, from the distortion occurrence region; and
   a region remover that changes a third digital signal in the nonuse region to a predetermined value or removes the third digital signal.

3. The reception device according to claim 2, wherein the region detector includes:
   a storage unit that holds the known signal; and
   a comparator that determines the distortion occurrence region on a basis of a result of comparison between the first digital signal and the known signal read out from the storage unit.

4. The reception device according to claim 2, wherein the region detector calculates the distortion occurrence region in a region determined on a basis of a modulation method applied to the signal received by the receiver.

5. The reception device according to claim 4, wherein the distortion occurrence region determined on the basis of the modulation method is within a range of a predetermined number of samples from a symbol header of the digital signal.

6. The reception device according to claim 1, wherein the demodulator calculates likelihood by using the digital signal in which a third digital signal in the nonuse region is changed to a predetermined value or is removed, and performs maximum likelihood demodulation for outputting data giving maximum likelihood.

7. A transmission reception system comprising:
   a transmitter that transmits a signal containing a known signal part and a data part representing plural data modulation symbols; and
   a receiver that includes:
      an A/D converter that converts a signal received by a receiver into a digital signal including the plural data modulation symbols;
      a region determinator that determines a nonuse region corresponding to a distortion region around transitions between adjacent data modulation symbols and produces a periodic signal identifying the distortion region; and a demodulator that performs demodulation on the digital signal in a region other than the nonuse region in the digital signal so as to demodulate each of the data modulation symbols.

8. A reception method for receiving a signal containing a known signal part and a data part representing plural data modulation symbols, the reception method comprising:

converting the received signal into a digital signal;

determining a nonuse region corresponding to a distortion region around transitions between adjacent data modulation symbols and produces a periodic signal identifying the distortion region; and demodulating the digital signal in a region other than the nonuse region in the digital signal so as to demodulate each of the data modulation symbols.

* * * * *